Jan. 17, 1961 W. F. HOLIN 2,968,371
BRAKE RIGGING STABILIZER
Original Filed Nov. 4, 1954 3 Sheets-Sheet 1

INVENTOR.
William F. Holin
BY J. L. Carpenter
ATTORNEY

Jan. 17, 1961 W. F. HOLIN 2,968,371
BRAKE RIGGING STABILIZER
Original Filed Nov. 4, 1954 3 Sheets-Sheet 2
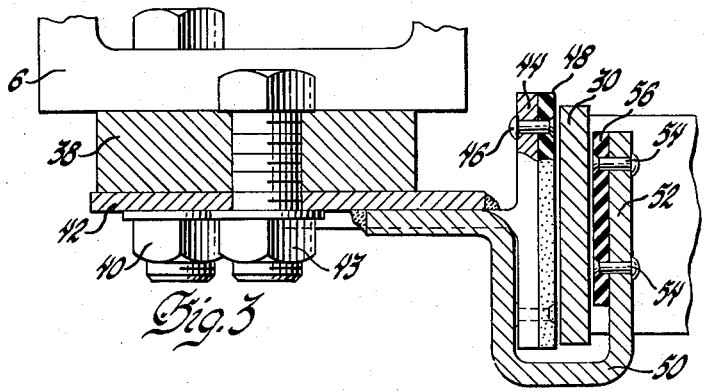
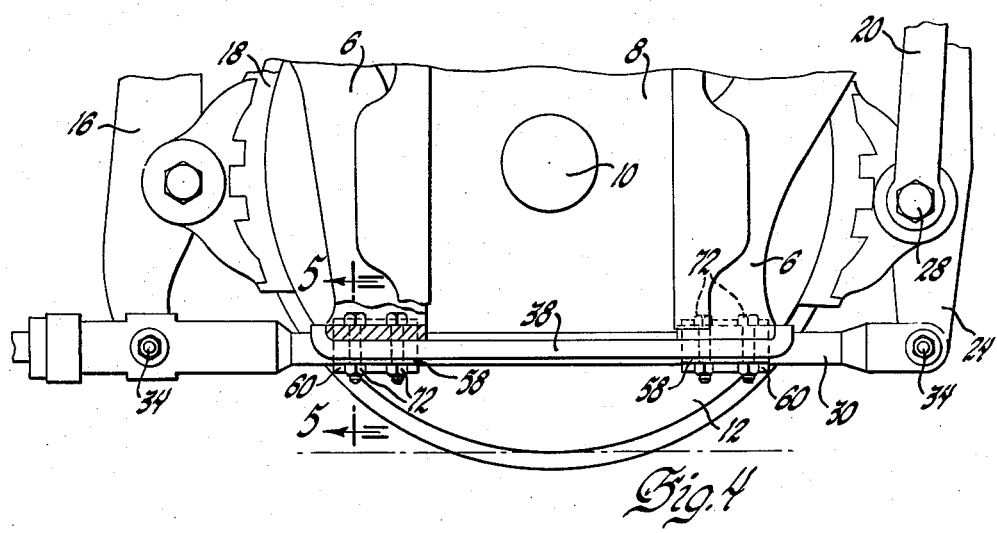
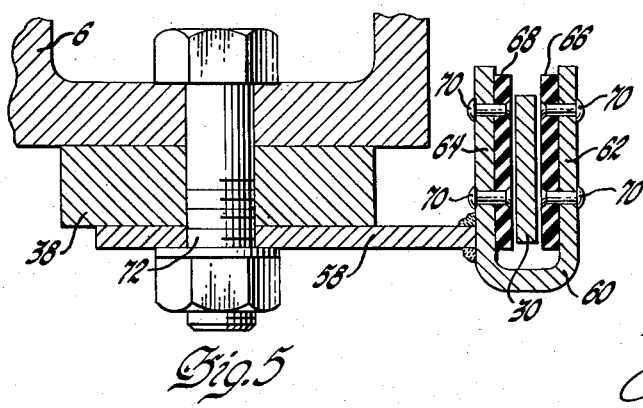
INVENTOR.
William F. Holin
BY
J. L. Carpenter
ATTORNEY

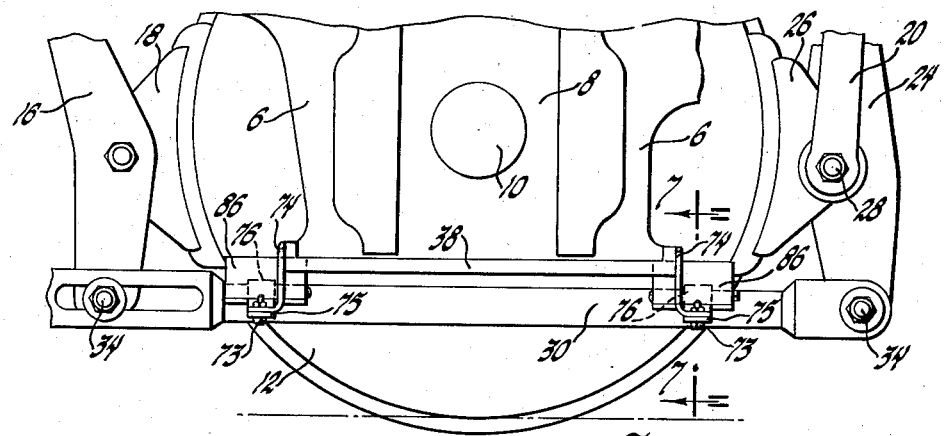
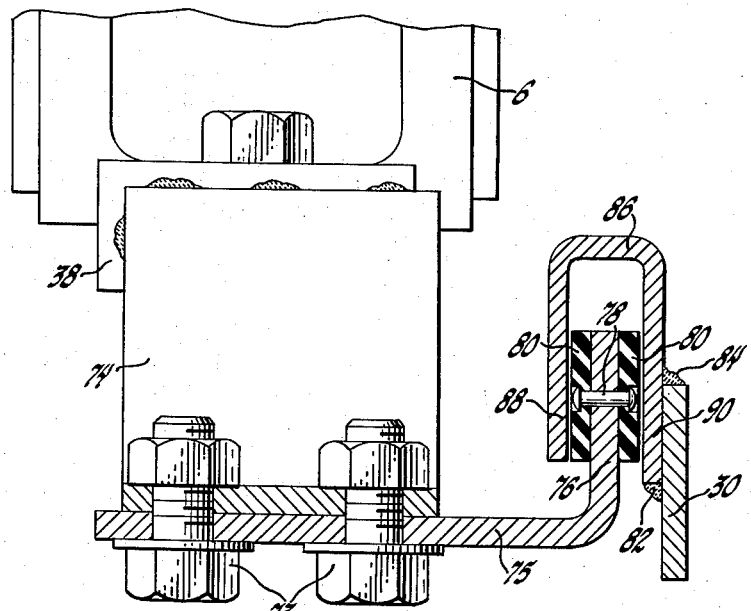

United States Patent Office 2,968,371
Patented Jan. 17, 1961

2,968,371

BRAKE RIGGING STABILIZER

William F. Holin, Riverside, Ill., assignor to General Motors Corporation, Detroit, Mich., a corporation of Delaware Original application Nov. 4, 1954, Ser. No. 466,854, now Patent No. 2,911,073, dated Nov. 3, 1959. Divided and this application Mar. 19, 1959, Ser. No. 800,479

2 Claims. (Cl. 188—190)

This is a division of my co-pending application Serial No. 466,854, filed November 4, 1954, now U.S. Patent No. 2,911,073.

This invention relates generally to railway vehicles and more particularly to the brake rigging therefor.

With the innovation of the clasp-type brake rigging for braking railway vehicles there has existed the problem of the rigging swinging laterally back and forth on the truck frames into and out of engagement with the truck wheels. This lateral instability of the rigging has resulted in excessive wear of certain elements thereof as well as excessive wear on the adjacent wheels, not to mention the undesirable noise resulting from the rigging "banging" into and scraping the sides of the wheels. For years it has been recognized that there has been a need for some means to stabilize the rigging laterally and to prevent its inadvertent engagement with the sides of the railway vehicle wheels. Up to the present time, however, no such means has ever been known to have been provided.

While the instant invention may be used on any type of railway vehicle brake rigging to stabilize the rigging on the vehicle truck and prevent its engagement with the sides of the railway vehicle wheels it is most particularly concerned with the type of rigging known as "clasp" brake rigging. This type of brake rigging for one wheel of the vehicle usually comprises a pair of vertical brake levers pivotally suspended before and behind the wheel. The vertical brake levers are provided intermediate the ends with the usual brake heads and shoes for engaging the wheel and are linked together at their lower ends by means of horizontal bars or tie rods, one on either side of the wheel. The rigging is normally operated by braking cylinders operatively connected to the upper end of one of the vertical brake levers. In railroad constructions the riggings are made up of relatively heavy and somewhat cumbersome parts whose tolerances are relatively large. As a result the points of pivotal connection of the vertical levers to the frame, while designed to enable the rigging to operate in the plane of the wheel, due to the lengths of the levers and the loose pin connections allow a certain amount of lateral movement of the rigging which as a consequence thereof tends to swing back and forth and also twist to some extent due to the motion of the vehicle truck. This lateral swinging is often of such amplitude as to cause the rigging to "bang" into the sides of the wheel thereby causing excessive wear on both the horizontal tie bars or rods and also on the sides, rims and flange edges of the wheels.

Most of the present day railway vehicle truck frames usually include a plurality of downwardly depending pedestal pairs between which are slidingly engaged journal box assemblies receiving and being supported by the journals on the ends of the wheeled axles of the railway vehicle truck. In order to retain the journal box assemblies between the pedestal pairs a pedetsal tie bar or strap is provided at the lower ends thereof so that if the railway vehicle truck is lifted by its frame, or otherwise, the wheeled axles and journal box assemblies are also lifted with the truck. In the present instance it is determined to utilize the lower ends of these pedestal assemblies and perhaps the tie bar strap which connects the pedestal pairs together as a supporting means for a unique stabilizing structure which will engage the railway vehicle brake rigging and prevent its lateral swinging into the sides of the railway vehicle wheel. This is accomplished by connecting to the lower ends of the pedestal assemblies and the tie bar strap longitudinally spaced members having laterally inwardly facing and outwardly facing surfaces which engage the brake rigging tie bars along their lengths so as to prevent any substantial lateral movement of these tie bars and the brake rigging of which they are a part.

For a further understanding of this invention and the objects thereof reference may be had to the accompanying detailed description and drawings, in which:

Fig. 1 shows the pedestal assemblies having the unique stabilizing means secrued thereto so as to engage one of the horizontal tie bars which link the lower ends of the vertical brake levers;

Fig. 3 is an enlarged view in section taken on the line 3—3 of Fig. 1 to illustrate in more detail the unique stabilizing means and its manner of attachment to the pedestal pairs;

Fig. 4 is a side view in elevation of a portion of a railway vehicle truck including a wheel thereof with a modified type of stabilizing means attached to each pedestal so as to be adjacent and guide one of the horizontal tie bars at spaced points along its length;

Fig. 5 is a view in section taken on the line 5—5 illustrating the details of the modified stabilizing means of Fig. 4 and its manner of attachment to the lower end of its associated pedestal;

Fig. 6 is a side view in elevation of a portion of a railway vehicle truck including a wheel thereof and represents another modification of brake rigging stabilizing and guide means which is individually attached to associated pedestals;

Fig. 7 is a view taken on the line 7—7 of Fig. 6 and illustrates details of the modification of Fig. 6 and its manner of attachment to the lower end of the pedestals.

Figure 1:
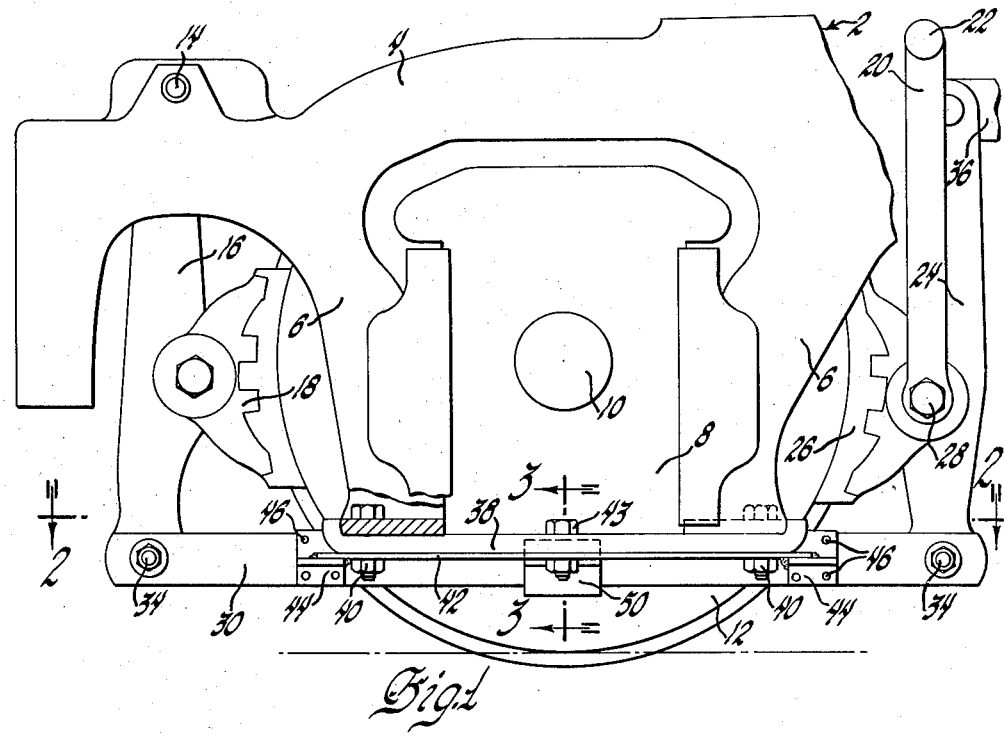
Fig. 1 is a side view in elevation of a portion of a railway vehicle truck including a wheel thereof with a clasp-type brake rigging suspended from the truck.
Figure 2:
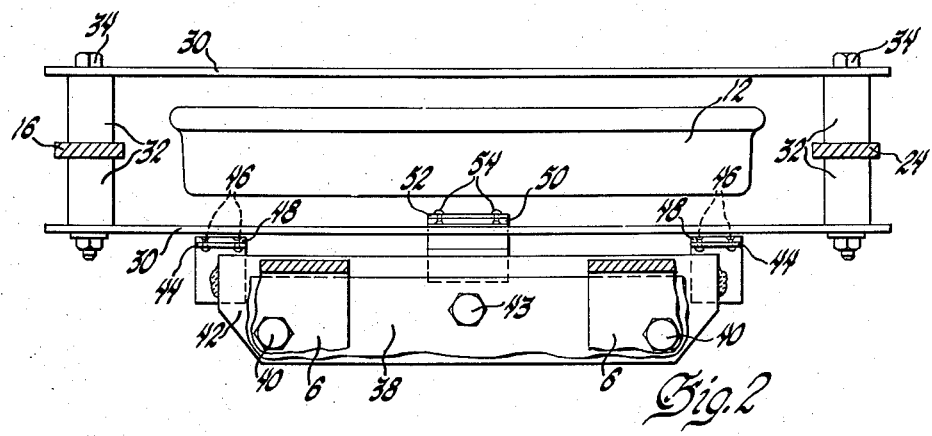
Fig. 2 is a view in plan taken on the line 2—2 of Fig. 1 and illustrates how the horizontal tie bars are located on either side of the wheel and how the outer tie bar is stabilized between unique stabilizing means so as to prevent the tie bars from moving into engagement with either side of the wheel.

Referring first to Figs. 1 and 2 it will be observed that the portion of the vehicle truck comprises a truck frame, indicated generally by the numeral 2, which includes a side frame 4. The side frame 4 is provided with downwardly depending oppositely disposed pairs of pedestals 6 between which is slidingly disposed a journal box assembly 8 having rotatably journaled therein the journal end of an axle 10. The axle 10 is provided with the usual railway vehicle wheels 12. Connecting the lower ends of pedestals 6 so as to retain the journal box assemblies 8 between pedestals 6 is a pedestal tie bar or strap 38 which is secured to the lower ends of the pedestals by means of bolt and nut assemblies 40.

Pivotally suspended at the point 14 from the side frame 4 and in front of the wheel 12 is a so-called "dead" vertical brake lever 16 having pivotally connected thereto intermediate the ends thereof the usual brake head and shoe assembly 18. Also pivotally suspended from the side frame 4 behind the wheel 12 by means of brake hangers 20 connected to the frame 4 at point 22 is a so-called "live" vertical brake lever 24. The live brake lever 24 is pivotally connected to the lower ends of the straps 20 and a second brake head and shoe assembly 26 at the point 28. As best seen in Fig. 2 the lower ends of the vertical brake levers 16 and 24 are linked together by means of horizontal tie bars or links 30, one on each side of the wheel 12. The links 30 are maintained properly spaced on either side of the levers 16 and 24 and connected to the lower ends thereof by means of spacers 32 through which the bolts 34 extend, the bolts 34 also extending through the ends of the bars or rods 30 and the lower ends of the levers 16 and 24. As mentioned, this type of brake rigging is normally known as "clasp" brake rigging and in the embodiment shown is individual to each wheel without any interconnecting members between the individual riggings for the other wheels. Its manner of operation, which is generally quite well known, is as follows: Connected to the upper end of the live brake lever 24 is a horizontal lever 36 which is normally operatively connected to an operating cylinder which, when actuated, would cause the lever 36 and the upper end of the live brake lever 24 to move to the left as viewed in Fig. 1. Movement of the upper end of lever 24 to the left as viewed in Fig. 1 will cause the lever 24 to initially pivot about its point of connection to the horizontal tension bars 30 until the brake head and shoe assembly 26 engages the rim of the wheel 12 after which further pivotal movement of lever 24 will take place about the point 28 causing the bars 30 to move to the right as viewed in Figs. 1 and 2. Movement of the bars 30 to the right will cause the "dead" vertical lever 16 to pivot in a counterclockwise direction about the point 14 until the brake shoe assembly 18 also engages the rim of the wheel 12 at which time full, individual wheel braking will be achieved.

In riggings of the type just described due to the length of the straps 20 and the levers 16 and 24 as well as the relatively loose pivotal connections 14, 22 and, in fact, all of the loose pivotal connections of the rigging, the rigging is capable of moving or swinging laterally with respect to the wheel 12 relatively large amounts which will, as easily seen in Fig. 2, cause the bars 30 to engage the sides of the wheel. This movement is not confined, however, to a purely lateral movement but also may include some twisting, in which case the inner bar 30 tends to wear down the flange of the wheel 12 and the outer bar, the rim of the wheel 12. This wear, as will be immediately appreciated, is highly objectionable. It will be observed, however, from the description of the motion which the rigging may have, that merely restraining the rigging at one point would not completely solve the problem since it would still enable the rigging to twist in the manner described so that wear could still take place between wheel 12 and rods 30 at the flange of the wheel and the outer portion of the rim of the wheel.

In order to restrain the rigging so that the bars 30 may not come in contact with the wheel 12 in any manner whatsoever while at the same time enabling the rigging to perform its desired function, brake rigging stabilizing means have been provided and form the subject matter of the present invention. These means include a lower member comprising a plate 42 (in addition to Figs. 1 and 2, see also now Fig. 3) which may be bolted to the lower ends of the pedestals 6 on the underside of the pedestal strap 38. A bolt assembly 43 is used to secure the center portion of plate 42 to the center of strap 38. While the member 42 in the present instance is shown as separate from the strap 38 it should be appreciated that the member 42 could serve both functions thereby eliminating the need for the strap 38. Connected to opposite ends of the member or plate 42 are small plates 44 having secured thereto as by rivets 46 (see Fig. 3) non-metallic pads 48, preferably made of some phenolic material. The pads 48 are provided with inwardly facing surfaces which, when the rigging is in a static position, are adjacent the outer side of the outer rod 30. Intermediate the plates 44 and pads 48 is a member 50 which, as best seen in Fig. 3, is in the form of a U-shaped bracket having a relatively long leg 52 located between the outer face of the wheel 12 and the inner face of the outer rod 30. The leg 52 has secured thereto, as by rivets 54, a non-metallic pad 56, which also is preferably of some phenolic material, having an inwardly facing surface which, when the rigging is in a static position, is adjacent the inner side of the outer of the rods 30.

From the foregoing description it will be appreciated that the outer of the rods 30 is prevented from moving laterally inwardly or outwardly because of the presence of the pads 56 and 48. By spacing the pads 48 along the outer of the bars 30 so that they are located longitudinally a considerable distance from the pad 56 any twisting movement of the rigging is also prevented. It will be observed, however, that the brake rigging may perform in its usual way since there is nothing to restrict the longitudinal movement of the rigging. The use of phenolic pads 48 and 56 practically eliminates any wear in the outer of the rods 30 and also decreases or practically eliminates any of the attendant noise which formerly accompanied the "banging" and scraping of the rigging on the wheel 12. As observed, the pads 48 and 56, which are of relatively cheap material, may be easily and quickly replaced when worn. This stabilizing or guiding means for the brake rigging has the obvious advantages of eliminating a substantial amount of noise, flange and rim wear of the wheel, as well as a considerable amount of wear in both the inner and outer rods 30. The result, of course, is to substantially increase the life of the wheel and rigging while at the same time enabling the rigging to better perform its function in a more quiet manner.

Referring now to Figs. 4 and 5 a modification of the brake rigging stabilizing or guide means is shown. The main elements of the truck including the brake rigging will carry the same reference characters as those used for the truck and brake rigging of the embodiments shown in Figs. 1, 2 and 3 and only the reference characters of the brake rigging stabilizing means will be changed. In the modification of Figs. 4 and 5 it will be observed that connected to the lower ends of each of the pedestals 6 below the pedestal tie bar or strap 38 is a small plate 58 having attached to the inner edge thereof a U-shaped member 60. The inner sides of the legs 62 and 64 of the U-shaped member are provided with oppositely disposed non-metallic pads 66 and 68 which are secured thereto as by the rivets 70. These pads have facing surfaces which are, when the rigging is in a static position, immediately adjacent the inner and outer sides of the outer of the rods 30. Since each of the pedestals 6 has one of these plates 58 including the member 60 secured thereto by means of bolt and nut assemblies 72, the brake rigging will also be stabilized along its length so that it cannot move laterally with respect to the wheel 12 nor can the rigging twist relative thereto.

The third modification of this unique stabilizing means, which is shown in Figs. 6 and 7, includes an L-shaped plate 74 which is attached to each of the lower ends of the pedestals 6, as for example, by being welded to the ends of the pedestal tie bar strap 38. Attached to each plate 74, as by bolt assemblies 73, is a second L-shaped member or plate 75. Each of the members 75 is provided with an upwardly facing leg 76 to which is secured on either side thereof by means of rivets 78 non-metallic pads 80, again preferably of some phenolic material. Secured to the outer of the rods 30, as by welding at the points 82 and 84, is an inverted U-shaped member 86 whose legs 88 and 90 embrace the leg 76 and pads 80 in such a manner that the legs are immediately adjacent the pads 80. Since two of these U-shaped members are provided on the outer of the rods 30 (one for each of the pedestals 6) the brake rigging will again be stabilized along its length so that it cannot move laterally with respect to the wheel 12 nor can the rigging twist relative thereto.

I claim:

1. In a railway vehicle truck including a side frame having oppositely disposed downwardly depending pedestals between which one end of an axle having a wheel thereon is journaled and a brake rigging including brake levers before and behind the wheel having their lower ends linked together by a horizontal bar on one side of the wheel, guide means attached to said pedestals comprising a member attached to one of said pedestals and having an upstanding portion, a U-shaped member secured to said bar the legs of which embrace said upstanding member and are guided thereby, a second member attached to the other of said pedestal assemblies and having an upstanding portion, a second U-shaped member longitudinally spaced from said first U-shaped member and secured to said bar, the legs of said second U-shaped member embracing the upstanding portion of said second member.

2. In a railway vehicle truck including a side frame having oppositely disposed downwardly depending pedestals between which one end of an axle having a wheel thereon is journaled and a brake rigging including brake levers before and behind the wheel having their lower ends linked together to a horizontal bar on one side of the wheel, guide means to prevent movement of said bar into engagement with said wheel comprising a pair of longitudinally spaced U-shaped portions and a pair of longitudinally spaced vertical portions each embraced by one of said U-shaped portions, one pair of said portions being on said bar and one of each of the other pair of said portions being fixed to an associated pedestal.

References Cited in the file of this patent

UNITED STATES PATENTS

| | | |
|---|---|---|
| 1,335,184 | Peycke | Mar. 30, 1920 |
| 1,913,625 | Crossman | June 13, 1933 |
| 1,969,114 | Baselt | Aug. 7, 1934 |
| 2,021,916 | Hedgcock | Nov. 26, 1935 |
| 2,678,113 | Angle | May 11, 1954 |
| 2,860,739 | Flesch | Nov. 18, 1958 |